P. C. WEGO.
GRAVITY CONVEYER.
APPLICATION FILED FEB. 19, 1920.
1,353,875.
Patented Sept. 28, 1920.
2 SHEETS—SHEET 1.
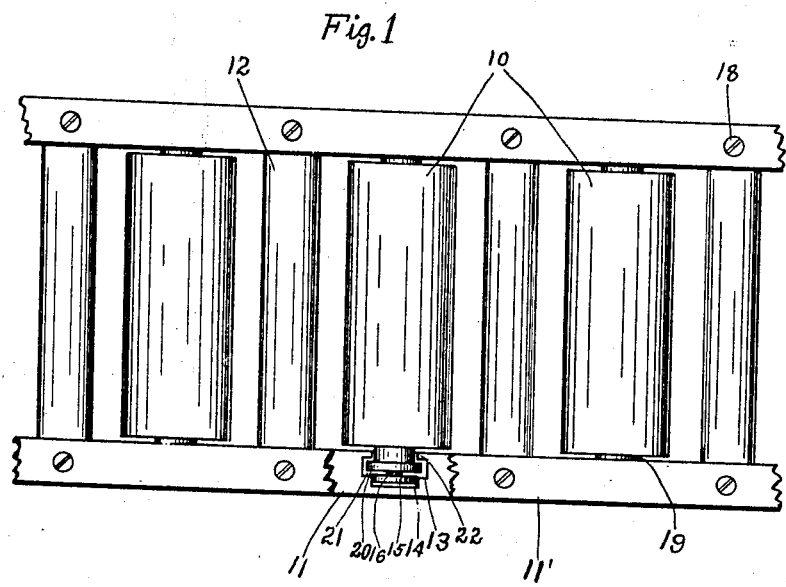
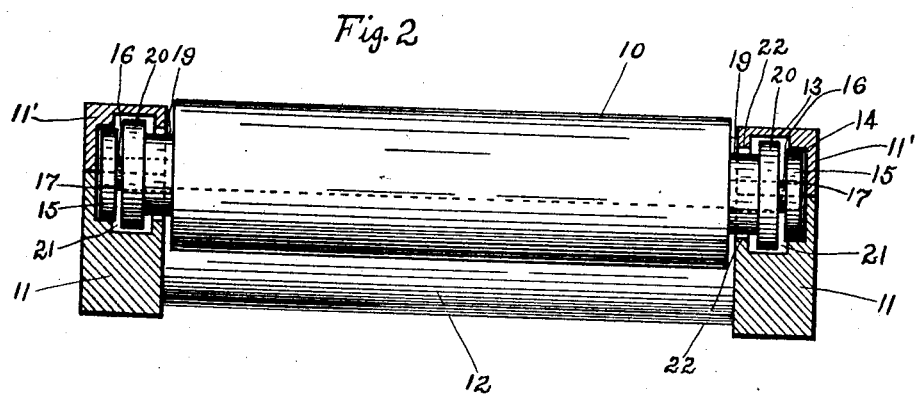
Inventor:
Peter C. Wego
by John E. Stephan
Attorney.

P. C. WEGO.
GRAVITY CONVEYER.
APPLICATION FILED FEB. 19, 1920.

1,353,875.

Patented Sept. 28, 1920.
2 SHEETS—SHEET 2.

Inventor:
Peter C. Wego
by John E. Stryker
Attorney.

UNITED STATES PATENT OFFICE.

PETER C. WEGO, OF ST. PAUL, MINNESOTA.

GRAVITY-CONVEYER.

1,353,875.

Specification of Letters Patent.

Patented Sept. 28, 1920.

Application filed February 19, 1920. Serial No. 359,973.

*To all whom it may concern:*

Be it known that I, PETER C. WEGO, a citizen of the United States, residing at St. Paul, in the county of Ramsey and State of Minnesota, have invented new and useful Improvements in Gravity - Conveyers, of which the following is a specification.

My invention relates to improvements in gravity conveyers.

Its object is to provide an efficient conveyer which shall be immune, or as nearly so as possible, from deterioration by corrosion and rust. As is well known, gravity carriers of the usual types, in which the metal parts are exposed, are in the presence of carbids, acids, brines and even water subject to rapid deterioration. This is particularly true of conveyers used in chemical plants and slaughter houses.

More specifically my purpose is to provide a conveyer in which the bearings shall be protected from corrosion and rust.

Figure 3:
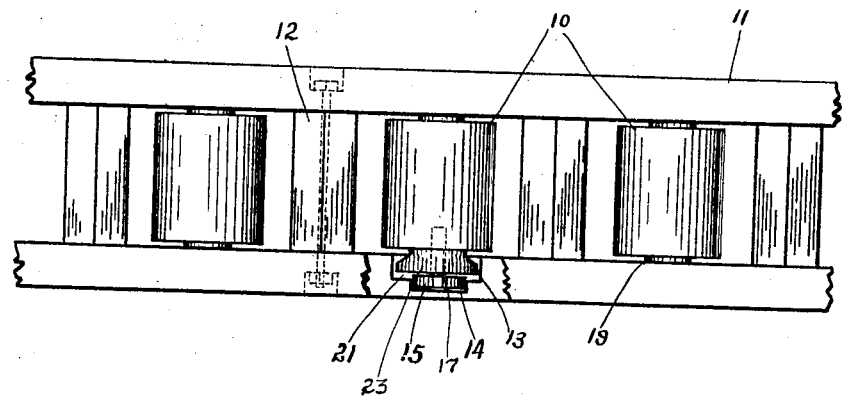
Figure 4:
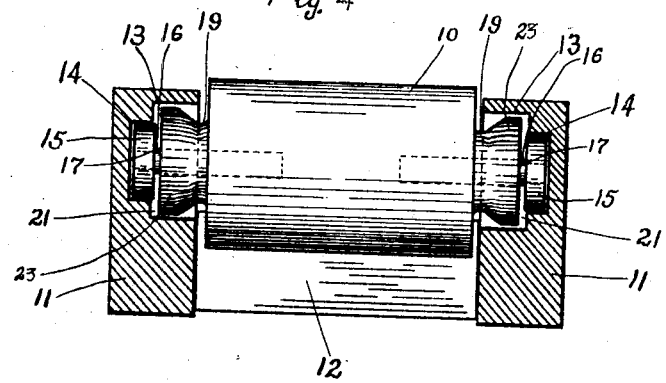

In the drawings Figure 1 is a plan of the preferred form of a section of my improved carrier with a portion of the casing broken away to show one of the bearings; Fig. 2 is an elevation, with the side rails in section to show the method of mounting the roller; Fig. 3 is a plan of an alternate construction with part of the side rails broken away to show the mounting; and Fig. 4 is a view of the alternate construction showing one of the rollers in elevation with the side rails in section.

In both forms of construction the rollers and side rails are composed of wood or other non-metallic material; the rollers are journaled in suitable metallic ball bearings, and the cages containing these ball bearings are deeply countersunk in the side rails and protected by grease cups formed in said rails, with axial enlargements upon the rollers to form revoluble stoppers for said cups.

In the drawings the numeral 10 indicates the rollers, 11 the side rails in which the rollers are journaled and 12 the cross braces uniting the side rails. A shouldered socket 13, having a reduced diameter 14 at its outer end to fit the ball cage 15, is formed in the rails 11 at each end of a roller 10, and the ends of the rolls are provided with pintles 16, inserted axially in the roller and formed with annular shoulders 17 adjacent to the bearings. It is of course to be understood that the journals, bearings and grease cups are duplicated at each end of each roller.

In the preferred form of construction shown in Figs. 1 and 2 the side rails are made in two longitudinal parts, the upper of these parts indicated by the numeral 11′ being attached by screws 18 to the body 11 of the side rail to permit the easy mounting and removal of the rollers 10. In this form of construction one half of the socket 13 is in each of the members 11 and 11′ of the rail, and the ends of the rollers are turned to form reduced axial extensions 19 terminating in a disk-like enlargement 20, which forms a plug for the grease cup 21. This grease cup is a cylindrical enlargement of the socket 13 adapted to freely receive the terminal enlargement on the roller. On the inner side of this grease cup is an annular flange 22 freely fitting about the reduced portion 19 of the roller 10.

In the alternate form of my invention shown in Figs. 3 and 4 the side rails 11 are each made from a single piece, and the annular flange 22 of the preferred construction is omitted, while the grease cup 21 is partially filled and revolubly plugged by the tapered enlargement 23 on the end of the roller 10.

In use the cavity 21 (in both forms) is filled with grease and this efficiently protects the metal bearings and journal pintles from the effect of chemicals, fumes or liquids which may come in contact with the conveyer. Furthermore, the structure as a whole forms a practical and successful gravity conveyer.

Having described my invention, what I claim as new and desire to protect by Letters Patent is:

1. A gravity conveyer comprising non-metallic rollers and side rails, a socket for a bearing, formed in the outer portion of the rails, axially arranged at each end of each roller, an enlargement of said socket forming a grease cup between said bearing and said roller, and a revoluble plug for said grease cup formed axially upon said roller.

2. A gravity conveyer comprising non-metallic rollers and side rails, a socket in the rails axially arranged at each end of the roller, the outer end of said socket being of reduced diameter and forming a casing for a bearing, a plug formed axially upon said roller and arranged within the larger bore of said socket, a journal fixed in said plug and a bearing in said casing.

3. A gravity conveyer comprising non-metallic rollers and side rails, a socket for a bearing in the outer portion of the rails axially arranged at each end of each roller, an enlargement of said socket forming a grease cup between said bearing and said roller, an annular flange, integral with the rail, on the inner side of the grease cup and a disk upon the end of the roller forming a revoluble plug for said grease cup.

In testimony whereof I have hereunto signed my name to this specification.

PETER C. WEGO.